United States Patent
Fukushima

(10) Patent No.: US 9,539,639 B2
(45) Date of Patent: Jan. 10, 2017

(54) CERAMIC CORE AND METHOD FOR PRODUCING SAME

(75) Inventor: Hideko Fukushima, Yasugi (JP)

(73) Assignee: HITACHI METALS, LTD., Tokyo (JP)

(*) Notice: Subject to any disclaimer, the term of this patent is extended or adjusted under 35 U.S.C. 154(b) by 189 days.

(21) Appl. No.: 14/236,671

(22) PCT Filed: Feb. 28, 2012

(86) PCT No.: PCT/JP2012/054884
§ 371 (c)(1),
(2), (4) Date: Feb. 3, 2014

(87) PCT Pub. No.: WO2013/018393
PCT Pub. Date: Feb. 7, 2013

(65) Prior Publication Data
US 2015/0321247 A1    Nov. 12, 2015

(30) Foreign Application Priority Data
Aug. 3, 2011 (JP) ................................. 2011-169919

(51) Int. Cl.
| | |
|---|---|
| *B22C 9/10* | (2006.01) |
| *C04B 35/64* | (2006.01) |
| *B22C 9/04* | (2006.01) |
| *B28B 1/24* | (2006.01) |
| *B22C 9/12* | (2006.01) |
| *C04B 35/14* | (2006.01) |
| *C04B 35/638* | (2006.01) |
| *B22C 1/02* | (2006.01) |
| *C03C 14/00* | (2006.01) |

(52) U.S. Cl.
CPC . *B22C 9/10* (2013.01); *B22C 1/02* (2013.01); *B22C 9/04* (2013.01); *B22C 9/12* (2013.01); *B28B 1/24* (2013.01); *C03C 14/00* (2013.01); *C04B 35/14* (2013.01); *C04B 35/638* (2013.01); *C04B 35/64* (2013.01); *C04B 2235/3201* (2013.01); *C04B 2235/3217* (2013.01); *C04B 2235/3248* (2013.01); *C04B 2235/3418* (2013.01); *C04B 2235/36* (2013.01); *C04B 2235/5436* (2013.01); *C04B 2235/6022* (2013.01); *C04B 2235/6562* (2013.01); *C04B 2235/6567* (2013.01); *C04B 2235/77* (2013.01); *C04B 2235/96* (2013.01)

(58) Field of Classification Search
CPC ..................................... B22C 9/10; B22C 1/02
USPC .................................. 164/369, 529; 106/38.9
See application file for complete search history.

(56) References Cited

U.S. PATENT DOCUMENTS

| | | |
|---|---|---|
| 4,093,017 A | 6/1978 | Miller, Jr. et al. |
| 4,583,581 A | 4/1986 | Ferguson et al. |
| 4,989,664 A | 2/1991 | Roth |
| 5,389,582 A | 2/1995 | Loxley et al. |
| 5,569,320 A | 10/1996 | Sasaki et al. |
| 2010/0294454 A1 | 11/2010 | Muller et al. |

FOREIGN PATENT DOCUMENTS

| | | |
|---|---|---|
| DE | 10 2006 049 379 A1 | 4/2008 |
| EP | 0 056 662 A2 | 7/1982 |
| EP | 0 179 649 A2 | 4/1986 |
| EP | 0 311 203 A2 | 4/1989 |
| GB | 2 202 542 A | 9/1988 |
| JP | 63-268536 A | 11/1988 |
| JP | 01-245941 A | 10/1989 |
| JP | 05-200479 A | 8/1993 |
| JP | 07-232967 A | 9/1995 |

OTHER PUBLICATIONS

Extended European Search Report issued Apr. 23, 2015, for Application No. 12819690.4-1362/2740550 PCT/JP2012054884, 9 pages.
Lequeuz N et al: "Shrinkage Reduction in Silica-based Refractory Cores Infiltrated with Boehmite", Journal of the American Ceramic Society, Blackwell Publishing, Malden, MA, US, vol. 78, No. 11, Jun. 23, 1995 (Jun. 23, 1995), pp. 2961-2166.
International Search Report of PCT/JP2012/054884 dated May 15, 2012.

*Primary Examiner* — Kevin P Kerns
(74) *Attorney, Agent, or Firm* — Sughrue Mion, PLLC

(57) ABSTRACT

A ceramic core is obtained by firing a mixture that contains 0.1-15.0% by mass of alumina and 0.005-0.1% by mass of potassium and/or sodium with the balance made up of silica and unavoidable impurities. Not less than 90% by mass of amorphous silica is contained in 100% by mass of the silica. A method for producing a ceramic core, wherein: a blended material is obtained by blending 25-45% by volume of a binder into 55-75% by volume of a mixture that is obtained by mixing alumina, potassium and/or sodium, and silica so as to have the above-mentioned composition; the blended material is injected into a die so as to obtain a molded body; and the molded body is degreased at 500-600° C. for 1-10 hours, and then fired at 1,200-1,400° C. for 1-10 hours.

6 Claims, 1 Drawing Sheet

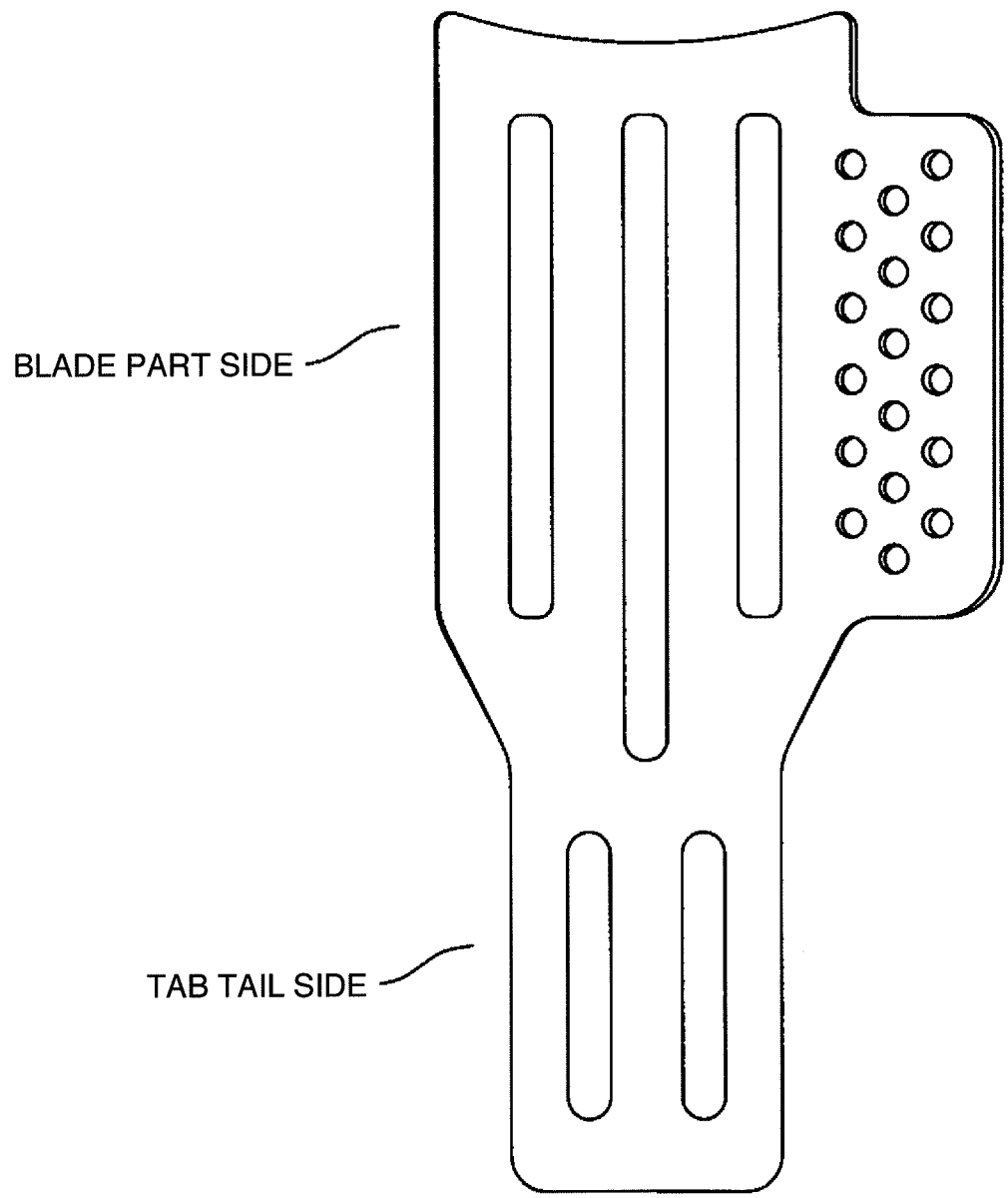

CERAMIC CORE AND METHOD FOR PRODUCING SAME

CROSS REFERENCE TO RELATED APPLICATIONS

This application is a National Stage of International Application No. PCT/JP2012/054884 filed Feb. 28, 2012 (claiming priority based on Japanese Patent Application No. 2011-169919, filed Aug. 3, 2011), the contents of which are incorporated herein by reference in their entirety.

TECHNICAL FIELD

The present invention relates to a ceramic core to be used for producing a casting including a hollow structure and to a method for producing the core.

BACKGROUND ART

Some castings having a hollow structure, such as blades for a gas turbine (turbine blade) made of a Ni-based heat resistant alloy, include hollow cooling holes inside the blade having a complicated shape and formed with high precision in order to increase cooling effect. Such blades can be produced by a lost wax precision casting method or the like by using a ceramic core of a shape corresponding to the intended hollow cooling hole.

The ceramic core is exposed to a molten metal at a temperature of about 1500° C. for several hours during a casting process. Thus, the core is sometimes thermally deformed by the molten metal or deformed by buoyant force, or it is damaged by a flow of the molten metal. Therefore, the ceramic core is required to have a mechanical strength at a high temperature around 1500° C. and dimensional stability so as not to contract or deform at the casting temperature. Moreover, the core is solved to be removed, with use of an aqueous sodium hydroxide or the like after completion of casting and therefore it is required to have dissolvability to the alkaline aqueous solution.

As such a ceramic core, for example, Patent Literature 1 proposes a ceramic core including 60 to 85 mass % of fused silica, 15 to 35 mass % of zircon and 1 to 5 mass % of cristobalite. It states that the ceramic core has a sufficient mechanical strength even at a casting temperature of about 1500° C. and has excellent dimensional stability since remarkable dimensional change is suppressed during a casting process, and that the core is easily dissolved after the casting.

Moreover, Patent Literature 2 proposes a ceramic core produced from 60 to 80 mass % of a fused silica powder, up to 15 mass % of yttria and up to 0.2 mass % of an alkaline metal. It is proposed that the core has a maximum strength of 12 MPa at room temperature and it is not deformed even at a high temperature of 1675° C., which is considerably higher than 1500° C.

Patent Literature 3 proposes a ceramic core produced from fused silica and sodium stabilized colloidal silica. It is proposed that the core has strength of about 7 MPa at a room temperature.

CITATION LIST

Patent Literature

Patent Literature 1: JP-A-01-245941
Patent Literature 2: European Patent No. 0179649
Patent Literature 3: U.S. Pat. No. 4,093,017

SUMMARY OF INVENTION

The ceramic core disclosed in the Patent Literature 1, which is produced from fused silica, zircon and a cristobalite as crystalline silica, has a problem that the core is readily damaged during handling at a room temperature or during molding a lost pattern in an injection molding step in a lost wax precision casting. Therefore, the core is desired to have an increased bending strength at room temperature (25° C.).

The ceramic core disclosed in the Patent Literature 2, which is produced from fused silica, yttria and an alkaline metal, is stated to be hardly deformed even at a considerably high temperature of 1675° C. However, in view of brittle fracture as well as deformation, the core has a problem that it is liable to be damaged like the brittle fracture depending on a shape of a casting, by a molten metal injected during a casting process. Therefore, the core is desired to have an increased bending strength at a temperature of the casting, that is around 1500° C. Moreover, in terms of contraction occurring upon exposure to the casting temperature, it is desired to have further increased dimensional stability during a casting process.

The ceramic core disclosed in the Patent Literature 3, which is produced from fused silica or an amorphous silica and sodium stabilized colloidal silica, has strength of about 7 MPa at a room temperature. However, in view of damage during the handling or the injection molding process, the core has a problem in the bending strength at a room temperature, and therefore further increased bending strength is desired. In addition, in view of brittle fracture, the core has a problem in the bending strength at the temperature around 1500° C. in a casting process as the core of Patent Literature 1. Therefore, further increased bending strength is desired. Furthermore, the core is desired to have further increased dimensional stability during a casting process.

To solve these problems, the present invention provides a ceramic core having a sufficient bending strength for handling at a room temperature after sintered, and a bending strength and a dimensional stability such that the core does not deformed or damaged when exposed to a high temperature during a casting process, and furthermore having excellent dissolvability in an alkaline aqueous solution. The present invention also provides a method for producing the ceramic core.

Solution to Problem

The present inventor has made studies in detail on bending strength and dimensional stability of the ceramic core in a high temperature range and furthermore dissolvability in an alkaline aqueous solution to find out that an appropriate amount of alumina is effective in improving the above properties of the ceramic core mainly including silica and that appropriate adjustment of the content of potassium and/or sodium is extremely effective in improving the bending strength at a high temperature. Thus, the present invention has been achieved.

The ceramic core according to the invention is obtained by sintering a mixture including 0.1 to 15.0 mass % of alumina, 0.005 to 0.1 mass % of at least one of potassium and sodium, and the balance being silica and inevitable impurities, wherein the silica includes not less than 90 mass % of amorphous silica in relation to the whole silica.

All of the silica is preferably amorphous silica.

It is preferable that the mixture includes 0.5 to 35.0 mass % of zircon.

Furthermore, it is preferable that the core is sintered so as to have a relative density of 60 to 80%.

Furthermore, it is preferable that the ceramic core has a bending strength of not lower than 10 MPa at a room temperature (25° C.) and a bending strength of not lower than 5 MPa at 1550° C.

In a preferable embodiment, the ceramic core is obtained by sintering a mixture including 0.1 to 15.0 mass % of alumina, 0.5 to 35.0 mass % of zircon and the silica so as to have a relative density of 60 to 80%, a bending strength of not lower than 10 MPa at 25° C., and a bending strength of not lower than 5 MPa at 1550° C., wherein all of the silica is amorphous silica including 5 to 30 mass % of coarse particles having a particle size of not smaller than 50 μm and wherein the amorphous silica has an average particle size of 5 to 35 μm.

The ceramic core according to the invention can be produced by a method including:

mixing 0.1 to 15.0 mass % of alumina, 0.005 to 0.1 mass % of at least one of potassium and sodium, and the balance being silica and inevitable impurities, wherein the silica includes not less than 90 mass % of amorphous silica in relation to the whole silica, to obtain a mixture, blending 55 to 75 volume % of the mixture and 25 to 45 volume % of a binder to obtain a blend, then injecting the blend into a die to produce a molded body, degreasing the molded body at 500 to 600° C. for 1 to 10 hours, and then sintering the molded body at 1200 to 1400° C. for 1 to 10 hours.

In the method, all of the silica is preferably amorphous silica.

It is preferable that the mixture includes 0.5 to 35.0 mass % of zircon.

Furthermore, it is preferable that the core is sintered so as to have a relative density of 60 to 80%.

Furthermore, it is preferable that the ceramic core is sintered so as to have a bending strength of not less than 10 MPa at a room temperature (25° C.) and a bending strength of not less than 5 MPa at 1550° C.

In a preferable embodiment, the method including:

mixing 0.1 to 15.0 mass % of alumina, 0.5 to 35.0 mass % of zircon and the silica wherein all of the silica is amorphous silica including 5 to 30 mass % of coarse particles having a particle size of not smaller than 50 μm and the amorphous silica has an average particle size of 5 to 35 μm, to obtain a mixture, blending 55 to 75 volume % of the mixture and 25 to 45 volume % of a binder to obtain a blend, then injecting the blend into a die to produce a molded body, degreasing the molded body at 500 to 600° C. for 1 to 10 hours, and then sintering the molded body at 1200 to 1400° C. for 1 to 10 hours.

A preferable injection pressure of the blend into a die is 1 to 200 MPa.

A more preferable injection pressure is 1 to 80 MPa.

According to the present invention, a ceramic core can be obtained which has a sufficient bending strength for handling at a room temperature after sintered, and excellent bending strength and dimensional stability even at a high temperature in a casting process, for example, at a temperature of 1400° C. to 1600° C. of a molten metal such as a Fe- or Ni-based heat resistant alloy, and furthermore having excellent dissolvability to an alkaline aqueous solution. Thus, it can produce an excellent casting having a hollow structure, for example a blade for gas turbine made of a Ni-based heat resistant alloy or the like. Accordingly, the invention contributes to a development of industry.

BRIEF DESCRIPTION OF DRAWING

FIG. 1 is a view showing an example of a ceramic core according to the present invention.

DESCRIPTION OF EMBODIMENTS

An important feature in the present invention is a mixture for obtaining a ceramic core mainly including silica. An appropriate amount of alumina is added to the silica which is a main component, and sodium, potassium or both is also added to adjust the amounts of these components appropriately. Specifically, 0.005 to 0.1 mass % of at least one of potassium and sodium is added to a composition that includes silica including not less than 90 mass % of amorphous silica in relation to the whole silica and 0.1 to 15.0 mass % of alumina. By the constitution, the ceramic core has a high bending strength at a room temperature after sintered since a large amount of amorphous silica exists. Furthermore, the core has a high bending strength at a high temperature during a casting process since a large amount of crystalline silica exists and the generation of a liquid phase is suppressed by the appropriate adjustment of the content of potassium or sodium.

Hereinafter, the ceramic core according to the invention will be explained in detail.

A base composition of the ceramic core includes silica including not less than 90 mass % amorphous silica in relation to the total amount of silica, and 0.1 to 15.0 mass % of alumina. Since the base composition includes the above silica and alumina, the core has an excellent heat resistance, and hardly reacts with a molten metal of a Ni-based heat resistant alloy which is often applied to a blade for gas turbine or the like. The core also has excellent dimensional stability during a casting process.

In the invention, silica includes amorphous silica by 90 mass % in relation to the silica 100 mass % as described above. By using this silica, sinterability is improved when the molded body is sintered to the ceramic core. Moreover, it is desirable that the core cooled to a room temperature after the sintering includes a large amount of amorphous silica since a large amount of amorphous silica increases the bending strength at a room temperature. Therefore, all of silica is desirably amorphous silica, so that the sinterability and the bending strength at a room temperature can be advantageously improved. Furthermore, adjustment of the amount of amorphous silica in relation to the amount of alumina or potassium and/or sodium makes, in general, the bending strength at a room temperature (25° C.) of the core not lower than 10 MPa.

In the invention, alumina is included in an amount of 0.1 to 15.0 mass % as described above. Controlling the alumina content in this range can contribute to increase in the bending strength during a casting process or in the high temperature range due to refractoriness of alumina, and can improve dimensional stability. The ceramic core sometimes contracts when it is exposed to a high temperature during a casting process, and deviates from a target dimension. Thus, the present inventor evaluated the dimensional stability of the ceramic core with a contraction rate at a casting temperature and confirmed that an upper limit of practical contraction rate is preferably 2% that is close to elongation of a casting, while an ideal contraction rate is 0%. In the study, it has been found that alumina contributes to the reduction of the contraction rate about 7 times larger than zircon per unit content. Since a core including a large amount of alumina or zircon becomes hard to be dissolved in an alkaline aqueous solution, alumina is essential for the core of the invention since it has higher contraction rate reducing effect.

According to the present inventor's study, it has been found that addition of not less than 0.1 mass % alumina to silica can improve the brittleness strength or dimensional stability during a casting process. When the alumina content in silica is not greater than 15.0 mass %, the dissolvability of the core to the alkaline aqueous solution can be improved. As described later in an Example, when the content of alumina is 0.5 mass %, a contraction rate during a casting process becomes 1.0%, and when the content of alumina is 1.5 mass %, the contraction rate becomes 0.4%. Then, the alumina content is preferably not less than 0.5 mass % to make the contraction rate not greater than 1.0%. More preferably, the alumina content is not less than 1.0 mass % to make the contraction rate not greater than 0.5%.

It is particularly important to add 0.005 to 0.1 mass % of at least one of sodium and potassium in the composition including silica and alumina for increasing mechanical strength of the ceramic core in the high temperature range. By adjusting the content of potassium and/or sodium, the core can have a bending strength of not lower than 5 MPa even at a temperature of 1300° C. Furthermore, the ceramic core can maintain a bending strength of not lower than 5 MPa even at a high temperature of 1400° C. to 1600° C. which is a casting temperature for a Ni-based heat resistant alloy or the like.

When an amount of at least one of potassium and sodium exceeds 0.1 mass %, a complex oxide between potassium and/or sodium and silica and/or alumina is liable to be formed at a grain boundary. When a temperature exceeds 1000° C., the complex oxide transforms in a liquid phase. The bending strength of the ceramic core gradually decreases as the temperature rises and the liquid phase increases, and becomes close to zero at a temperature around 1500° C.

As described above, it is desirable that potassium and sodium do not exceed an appropriate amount in view of a bending strength of the ceramic core at a high temperature. However, since the above complex oxide facilitates densification of a sintered body, the complex oxide increases a bending strength at a room temperature of the core. Therefore, not greater than 0.005 mass % of at least one of potassium and sodium are effective for generating the complex oxide as a sintering additive. On the other hand, since too dense sintered body deteriorates dissolvability, it is desirable to suppress potassium and/or sodium to not more than 0.1 mass % as described above.

It has been confirmed in the present inventor's study that potassium and sodium exhibit the above effect almost equally. Therefore, the ceramic core of the invention may include only potassium, only sodium or both elements simultaneously. It is important to include 0.005 to 0.1 mass % of at least one of potassium and sodium.

As described above, the ceramic core of the invention is obtained by sintering a mixture of 0.1 to 15.0 mass % of alumina, 0.005 to 0.1 mass % of at least one of potassium and sodium, and the balance of silica. Silica includes not less than 90 mass % of amorphous silica in relation to silica 100 mass %. A relative density of the core is desirably adjusted to 60 to 80% in order to provide a bending strength for handling at a room temperature and dissolvability to an alkaline aqueous solution.

The relative density of the ceramic core may be adjusted as necessary. It can be made higher in view of a mechanical strength only, or it can be made lower in view of dissolvability only. Thus, the mechanical strength and the dissolvability of the core are contradictory requirements. When the relative density of the core is 75 to 80%, the bending strength at a room temperature is more increased. When the relative density is 60 to 65%, the dissolvability to an alkaline aqueous solution is more improved. When the relative density of the ceramic core is 65% to 75%, both the bending strength and the dissolvability are satisfied. The relative density of the core can be adjusted by an amount of a binder in a molded body, a sintering temperature of the molded body, a holding time period thereof or the like.

The relative density in the invention is the same definition as that defined in JIS-Z2500. It is a ratio of actual density to a theoretical ratio. The actual density is obtained by dividing a mass of an actual ceramic core by a volume which is determined from its dimensions. The theoretical density is obtained from theoretical densities of silica and alumina and their ratio in the composition, assuming that silica ($SiO_2$) and alumina ($Al_2O_3$) exist independently in the sintered structure of the core. That is, the relative density is a value obtained by dividing the actual density by the theoretical density and expressed in percentage. In a case where zircon ($ZrSiO_4$) is added, it is assumed that zircon also exists independently. In determining the theoretical density, since an amount of potassium and sodium is smaller compared with others, it is negligible for the calculation of the relative density and therefore is not considered.

As described above, the ceramic core of the invention is obtained by sintering a mixture of 0.1 to 15.0 mass % of alumina, 0.005 to 0.1 mass % of at least one of potassium and sodium, and the balance of silica, wherein silica includes not less than 90 mass % of amorphous silica in relation to silica 100 mass %. By this constitution, the core has a bending strength of not lower than 10 MPa at a room temperature (25° C.) and a bending strength of not lower than 5 MPa at a high temperature (1550° C.). The core becomes hard to be damaged during handling or during an injection molding process for producing a wax model, when the core has a bending strength of not lower than 10 MPa at a room temperature. It becomes hard to be deformed or damaged at the time of injecting a molten metal or at the time of solidification of the molten metal during a casting when the core has a bending strength of not lower than 5 MPa at the high temperature.

As described above, the ceramic core of the invention has a basic constitution of a mixture including silica, alumina, and at least one of potassium and sodium. Zircon may be added to the constitution by 0.5 to 35.0 mass %, since zircon has an effect of reducing a contraction rate of the core at a high temperature although the effect is not as high as alumina. It has been found in the present inventor's study that coexisting of zircon and alumina at an appropriate balance improves synergistically the reducing effect of the contraction rate of the core at the high temperature. Therefore, the core preferably includes not less than 0.5 mass % zircon, so that the contraction rate of the core at the high temperature can be reduced to not more than 1%, or furthermore, not more than 0.5%.

As the above, it is preferable that the ceramic core includes zircon. However, when the total amount of zircon and alumina exceeds 50.0 mass %, dissolvability to an alkaline aqueous solution of the core is sometimes deteriorated remarkably. Therefore, it is desirable that the zircon content in the core is not more than 35.0 mass %. Preferably, the alumina content, whose dissolvability is less than that of zircon, is limited to not more than 5.0 mass % and zircon is included by 10.0 mass % or more, in order to improve the dissolvability to an alkaline aqueous solution while suppressing the contraction rate at a high temperature.

The ceramic core according to the invention will be explained below with reference to preferable embodiments.

As a raw material of the ceramic core, silica powder, alumina powder and further zircon powder or the like may be used. As the silica powder, fused silica as amorphous silica, cristobalite powder as crystalline silica, or silica powder in which amorphous silica and crystalline silica coexist or the like may be used. As potassium or sodium, a hydroxide such as potassium hydroxide or sodium hydroxide is preferable while a single metal is thought to be possible. Hydroxides are favourable in safety or handling, and in addition, the amount of hydroxides may be adjusted in consideration of the content in the powder material when the hydroxides are contained in the above powder material. In addition, a complex oxide containing potassium and/or sodium and silica and/or alumina may be used.

An average particle size, variation of particle size or the like of the powder can be selected in consideration of desired properties of the ceramic core.

For example, when the average particle size of silica powder is small, crystallization is facilitated through heating to generate crystalline silica and thus a bending strength of the core at a high temperature is increased. On the other hand, when the average particle size is large, a large amount of amorphous silica is contained in the core so that a bending strength at a room temperature is increased. In consideration of such a contradictory relation, silica powder preferably has an average particle size of 5 to 35 μm. When the size is less than 5 μm, there is possibility that dimensional stability during a casting process is deteriorated due to excessive crystallization or the bending strength at a room temperature is decreased. When the size exceeds 35 μm, there is possibility that the bending strength during a casting process is decreased.

When all of the silica component is amorphous silica, it is preferable to use amorphous silica, such as fused silica, which includes 5 to 30 mass % of coarse grains having a particle size of at least 50 μm and has an average particle size of 5 to 35 μm. Since not less than 5 mass % of coarse grains is included, a relative density of the ceramic core hardly becomes excessively large and the core has a favourable dissolvability to an alkaline aqueous solution. When the coarse grains exceeds 30 mass %, the relative density of the core is be excessively small and thus the bending strength at a room temperature is lowered.

Preferably, the average particle size of alumina powder is 1 to 5 μm. The average particle size of alumina powder of 1 μm or more contributes to improvement of dimensional stability during a casting process. However, when the average particle size exceeds 5 μm, the relative density of the core becomes excessively small, and the bending strength at a room temperature is lowered.

When zircon powder is included, an average particle size of the zircon powder is preferably 5 to 15 μm. When the average particle size of zircon powder is not less than 5 μm, a dimensional stability during a casting process is improved. However, when the average particle size exceeds 15 μm, a relative density of the core becomes excessively small, and thus the bending strength at a room temperature is lowered.

The average particle size referred to in this specification is obtained with a laser diffraction and scattering type particle size distribution measuring apparatus (particle size distribution measuring apparatus "Microtrac MT3000" manufactured by Nikkiso Co., Ltd.). Specifically, it uses a scattered laser beam which is irradiated to a powder sample suspended in a dispersion medium. An intensity distribution of the scattered light is measured with a plurality of optical detectors, and the information on the scattered light is A/D converted to carry out an analysis/calculation by a computer. The particle size distribution is based on volume. The particle size distribution is outputted such that the particle size is taken as an abscissa and the frequency or accumulation is taken as an ordinate, and the average particle size is defined as the value when the accumulation reaches 50%.

The term "granularity" in the specification means a diameter of each powdered grain measured by the above method, and is used without particular distinction from the particle size.

Next, a method for producing the ceramic core according to the invention having the above constitution will be explained in detail with specific embodiments.

The ceramic core according to the invention can be produced by a method comprising (1) a step of producing a blended material, (2) a step of producing an injection molded body, and (3) a step of degreasing and sintering.

Specifically, the step of producing a blended material (1) mainly comprises blending 55 to 75% by volume of a mixture including 0.1 to 15.0 mass % of alumina ($Al_2O_3$), 0.005 to 0.1 mass % of at least one of potassium (K) and sodium (Na) and the balance of silica ($SiO_2$), with 25 to 45% by volume of a binder. Here, the silica includes amorphous silica by not less than 90 mass % in relation to the whole silica.

The step of producing an injection molded body (2) mainly comprises injecting the blended material produced in the step (1) into a die to produce a molded body. The step of degreasing and sintering (3) mainly comprises degreasing the molded body produced in the step (2) at 500 to 600° C. for 1 to 10 hours and thereafter sintering the degreased molded body at 1200 to 1400° C. for 1 to 10 hours.

In the step (1), all of silica may be amorphous silica in the mixture including silica, alumina, and at least of potassium and sodium. The mixture may further include 0.5 to 35.0 mass % of zircon ($ZrSiO_4$).

In the step (1), a preferable blended material includes the mixture by 55 to 75% by volume and a binder by 25 to 45% by volume to make the ceramic core have an appropriate the relative density. In consideration of flowability for injection molding, the blended material more preferably includes 60 to 70% by volume of the mixture and 30 to 40% by volume of the binder. The blended material may be obtained for example, by using a mixing agitator, in which the binder is molten in a vessel, and then each material of silica, alumina, and potassium and/or sodium is charged therein, which are stirred by rotating an impeller until the blend becomes uniform. The blended material may be also obtained by a ball mill blending, a kneading or the like.

In this case, powders may be used as silica, alumina and zircon, and hydroxides or the like may be used as potassium and sodium.

The binder may preferably include, for example, one or more of paraffin, styrene-based thermoplastic elastomers, polyethylene glycols, cetyl alcohol, polypropylenes, polystyrenes, polybutylmethacrylates, and ethylene vinyl acetate copolymer resins. Furthermore, it is desirable to add cellulose fibers, dibutyl phthalate, or the like in order to improve plasticity of the molded body.

In the step (2), it is advantageous for the injection to keep the blended material in a softening temperature range of the binder. In the case, an injection pressure of the softened blended material is preferably 1 to 200 MPa. When the injection pressure is 1 MPa or more, a phenomenon which is referred to as "misrun" becomes hard to occur since a required amount of blended material is filled in a die. However, when the injection pressure exceeds 200 MPa, a burr becomes to be formed since the material is liable to inserts into a parting portion of a die. A generally available injection molding machine may be used without special alteration at the injection pressure of 1 to 150 MPa.

In the step (3), the degreasing temperature in degreasing the molded body is preferably 500 to 600° C. When the temperature is 500° C. or more, degreasing or removal of the binder is carried out appropriately, and thus the binder can be removed sufficiently from the molded body. When the temperature is 600° C. or less, defects such as swelling or cracks in the molded body can be suppressed. The degreasing time is preferably 1 to 10 hours. When the time is 1 hour or more, the removal of the binder is carried out sufficiently. However, it is not necessary to degrease exceeding 10 hours since the degreasing is conducted merely for sintering the molded body.

Moreover, when the temperature raising rate is 0.1° C./hour or more in degreasing the molded body, productivity is not impeded due to the temperature raising duration. When the temperature raising rate is 300° C./hour or less, defects such as swelling or cracks due to rapid decomposition of the binder in the molded body are hard to be generated. In the light of this point, and further, in consideration of the temperature range of softening of the binder and melting, it is desirable that the temperature raising rate in degreasing the molded body is selected 0.1 to 100° C./hour in a temperature range from a room temperature to 300° C., preferably 1 to 10° C./hour. Since decomposition proceeds due to burning of the binder in a temperature range from higher than 300° C. to 600° C., it is desirable that the temperature raising rate in degreasing the molded body is selected 1 to 300° C./hour, preferably 10 to 200° C./hour.

In the step (3), sintering conditions are important to make a relative density of the ceramic core preferable and to simultaneously improve bending strength at a room temperature and also in a high temperature range exceeding 1500° C.

The sintered ceramic core has a high bending strength at a room temperature when the core includes a large amount of amorphous silica. On the other hand, the core has a low bending strength at a room temperature when the core includes a large amount of crystalline silica, but the core has a high bending strength at a high temperature. Thus, increase in the bending strength at a room temperature and increase in the bending strength at a high temperature are in a contradictory relationship in a viewpoint of sinter structures. Therefore, it is important to control the structure of the silica to be used, the sintering temperature and the retention time thereof.

Accordingly, the present inventor has made studies on the sintering conditions so that the sintered structure has a large amount of amorphous silica at a room temperature and has a large amount of crystalline silica at a high temperature during a casting process by facilitating crystallization of the amorphous silica. Specifically, it has turned out that appropriately control of the sintering temperature in a temperature range at which amorphous silica starts to crystallize is important.

From the above, the temperature for sintering the molded body after degreasing is preferably 1200 to 1400° C. where amorphous silica is considered to start crystallization, and the sintering time is preferably 1 to 10 hours so as to achieve a preferable relative density of the core of 60 to 80%. When the sintering temperature is less than 1200° C., the sintering is insufficient. When the sintering temperature exceeds 1400° C., crystalline silica such as cristobalite is sometimes facilitated to generate in the sintered structure, and the bending strength at a room temperature of the core is lowered. In addition, the sintering temperature is preferably 1250 to 1350° C. in order to make the sintered structure of the core further uniform to increase the bending strength.

With regard to the sintering time, whole structure of the sintered core is liable to be insufficient when the time is less than 1 hour. When the time exceeds 10 hours, crystallization is facilitated and crystal grains grow, and thus the bending strength at a room temperature is sometimes lowered.

Moreover, a temperature rising rate in the sintering process is preferably 1 to 300° C./hour. When the rate is 1° C./hour or more, productivity is not lowered due to the temperature raising duration, and when the rate is 300° C./hour or less, defects such as cracks caused by rapid progress of the sintering is hard to be generated.

With regard to the atmosphere in sintering the molded body, non-reducing atmosphere is preferable to suppress decomposition of the oxides. As the non-reducing atmosphere, an inert gas such as a nitrogen gas or an argon gas may be used other than air.

EXAMPLES

Hereinafter, the ceramic core according to the invention and the method for producing the core will be described with specific examples. Please note that the invention is not limited to examples described below.

Blending Step

In the blending step, same materials were used in both Examples and Comparative Examples. Specifically, with regard to silica, fused silica powder was used as an amorphous silica, and cristobalite powder was used as a crystalline silica. As shown in Table 1, used fused silica powder was adjusted to have an average particle size of 19.0 μm without intentionally adding a powder having a granularity of 50 μm or more (coarse grain). Used cristobalite powder was adjusted to have an average particle size of 19.0 μm. As alumina, alumina powder adjusted to have an average particle size of 2.8 μm was used. As potassium or sodium, after consideration of the content in the above powder materials, the shortfall was compensated by potassium hydroxide or sodium hydroxide. In a case where zircon was added, zircon powder adjusted to have an average particle size of 9.5 μm was used.

Each mixture having a composition shown in Tables 1 and 2 using the above materials are prepared and a binder composed of paraffin and a styrene-based thermoplastic elastomer were also prepared. 32% by volume of the binder and 68% by volume of the mixture were sufficiently blended in a mixing agitator to produce each blended material.

Injecting Step

Next, each blended material was injected with a pressure of 7 MPa into a die including a cavity having a volume of 220 cm$^3$ which cavity corresponds to a shape of the ceramic core that is intended to be produced and each molded body was obtained. In this step, Examples and Comparative Examples were handled in the same manner.

Degreasing and Sintering Step

Next, each molded body was retained at a temperature of 580° C. for 5 hours, and thereby was almost degreased. The temperature raising rate from a room temperature to 300° C.

was controlled at 3° C./hour, and the rate from 300° C. to 580° C. was controlled at 50° C./hour. The molded body was completely degreased in the process of raising the temperature to the sintering temperature, and it was retained at the sintering temperature shown in Tables 1 and 2 for 2 hours. Thereby, ceramics or the like were sintered, and the ceramic cores shown as Examples 1 to 13 and Comparative Examples 1 to 4 were obtained. Also in this step, Examples and Comparative Examples were handled in the same manner. In addition, the cores were all formed so as to have an external appearance shown in FIG. 1 corresponding to a hollow moving blade for a gas turbine.

The ceramic cores of Examples 1 to 13 and Comparative Examples 1 to 4 produced as the above were measure as hereinafter to evaluate properties such as shown in Tables 1 and 2.

Bending Strength

Bending strength of the ceramic core was evaluated by producing a test piece of the core, and carrying out a bending test based on JIS-R1601 for a test at a room temperature and JIS-R1604 for a test at a high temperature. The bending test was carried out at a room temperature (25° C.) and at 1550° C. with a test piece having a size of 3×4×36 mm. A distance between support points were 30 mm, and a crosshead speed was 0.5 mm/minutes.

Dimensional Stability

The dimensional stability of the ceramic core was evaluated by a contraction rate during a casting process. A size of predetermined parts of the core was measured before and after a heat treatment and a rate of change was expressed in percentage. In this case, the heat treatment applied to the core was at 1550° C. for 2 hours.

Dissolvability to Alkaline Aqueous Solution

The evaluation of the dissolvability to an alkaline aqueous solution of the ceramic core was carried out as follows. A mold was actually produced with a core, and a molten metal was injected into the mold and then cooled. Thus, a mold including the core was obtained. The mold was dipped in a 30% aqueous potassium hydroxide solution having a temperature of 160° C. under 0.3 MPa for a fixed time (20 hours), and checked of the presence or absence of the core left in the mold after the immersion. These dip tests were carried out 4 times, and the evaluation was carried out by judging whether or not the core could be completely dissolved.

Presence or Absence of Damage

In the evaluation of the bending strengths at a room temperature and at a high temperature, the dimensional stability and the dissolvability, a presence or absence of damage of the core during handling, an injection process and a casting process was simultaneously confirmed.

TABLE 1

| | | Constitution of mixture [% by mass] | | | | | |
| --- | --- | --- | --- | --- | --- | --- | --- |
| | | In silica 100% by mass | | | | | |
| | Silica $SiO_2$ | Amorphous silica | Crystalline silica | Alumina $Al_2O_3$ | Zircon $ZrSiO_4$ | Sodium Na | Potassium K |
| Example 1 | Balance | 100.0 | 0.0 | 0.5 | 0.0 | 0.030 | 0.010 |
| Example 2 | Balance | 100.0 | 0.0 | 5.0 | 0.0 | 0.010 | 0.008 |
| Example 3 | Balance | 100.0 | 0.0 | 10.0 | 0.0 | 0.020 | 0.000 |
| Example 4 | Balance | 100.0 | 0.0 | 15.0 | 0.0 | 0.030 | 0.010 |
| Example 5 | Balance | 100.0 | 0.0 | 1.5 | 18.8 | 0.030 | 0.010 |
| Example 6 | Balance | 100.0 | 0.0 | 0.5 | 25.0 | 0.005 | 0.005 |
| Example 7 | Balance | 95.0 | 5.0 | 10.0 | 0.0 | 0.000 | 0.050 |
| Comparative Example 1 | Balance | 100.0 | 0.0 | 5.0 | 0.0 | 0.000 | 0.140 |
| Comparative Example 2 | Balance | 100.0 | 0.0 | 0.0 | 0.0 | 0.025 | 0.000 |
| Comparative Example 3 | Balance | 78.0 | 22.0 | 10.0 | 0.0 | 0.030 | 0.010 |

| | | Properties of ceramic core | | | | |
| --- | --- | --- | --- | --- | --- | --- |
| | Sintering temperature ° C. | Relative density % | Bending strength [MPa] | | Contraction rate during a casting process % | Presence or absence of undissolved residue |
| | | | Room temperature 25° C. | High temperature 1550° C. | | |
| Example 1 | 1300 | 70 | 12 | 35 | 1.0 | Absent |
| Example 2 | 1300 | 68 | 15 | 35 | 0.5 | Absent |
| Example 3 | 1300 | 70 | 18 | 37 | 0.4 | Absent |
| Example 4 | 1300 | 72 | 15 | 40 | 0.3 | Absent |
| Example 5 | 1300 | 72 | 20 | 40 | 0.4 | Absent |
| Example 6 | 1300 | 75 | 20 | 38 | 0.4 | Absent |
| Example 7 | 1300 | 70 | 12 | 40 | 0.3 | Absent |
| Comparative Example 1 | 1300 | 70 | 15 | 1 | 2.5 | Absent |
| Comparative Example 2 | 1300 | 70 | 12 | 3 | 9.0 | Absent |
| Comparative Example 3 | 1300 | 65 | 20 | 3 | 1.0 | Absent |

Note:
The description of "Balance" in the table includes inevitable impurities.

The ceramic cores according to the invention shown in Table 1 (Examples 1 to 7) are constituted by 0.1 to 15.0 mass % of alumina, 0.005 to 0.1 mass % of at least one of potassium and sodium, and the balance being silica and inevitable impurities, wherein the silica includes amorphous silica by not less than 90 mass % in relation to silica 100%. All of the cores according to the invention had a bending strength of not lower than 10 MPa at a room temperature (25° C.) and a bending strength of not lower than 5 MPa at a high temperature (1550° C.).

Therefore, it was confirmed that the core according to the invention constituted by the mixture shown in Table 1 had sufficient bending strength for handling at a room temperature after sintered and had a high bending strength endurable to casting for a long time. Moreover, the cores were not damaged in the evaluation processes during handling, an injection process and a casting process. Besides, all the cores according to the invention had a favourable dissolvability to an alkaline aqueous solution after casting, and a contraction rate during a casting process of 1.0% or less to show dimensional stability at a high temperature.

On the other hand, Comparative Example 1 having a total amount of potassium and sodium of 0.870 mass % had a low bending strength at a high temperature (1550° C.) of 1 MPa, and thus the bending strength endurable to casting for a long time could not be obtained. Furthermore, Comparative Example 1 had a large contraction rate during a casting process of 5.5% and could not have the dimensional stability at the high temperature. Comparative Example 2 that did not include alumina had a low bending strength at a high temperature (1550° C.) of 3 MPa, and the bending strength endurable to casting for a long time could not be obtained. Furthermore, Comparative Example 2 had a large contraction rate during a casting process of 5.0%, and could not have dimensional stability at the high temperature. Comparative Example 3 including smaller amount of amorphous silica of 78.0 mass % in the silica had a low bending strength at a high temperature (1550° C.) of 3 MPa, and the bending strength endurable to casting for a long time could not be obtained.

TABLE 2

Constitution of mixture [% by mass]

In 100% by mass of silica

| | Silica $SiO_2$ | Amorphous silica | Coarse grain | Average particle size (μm) | Crystalline silica | Alumina $Al_2O_3$ | Zircon $ZrSiO_4$ | Sodium Na | Potassium K |
|---|---|---|---|---|---|---|---|---|---|
| Example 8 | Balance | 100.0 | 8 | 9 | 0.0 | 1.5 | 19.0 | 0.030 | 0.010 |
| Example 9 | Balance | 100.0 | 11 | 11 | 0.0 | 0.8 | 18.8 | 0.030 | 0.010 |
| Example 10 | Balance | 100.0 | 15 | 22 | 0.0 | 4.7 | 10.8 | 0.010 | 0.008 |
| Example 11 | Balance | 100.0 | 20 | 28 | 0.0 | 9.7 | 1.1 | 0.020 | 0.000 |
| Example 12 | Balance | 100.0 | 25 | 19 | 0.0 | 0.3 | 0.7 | 0.030 | 0.010 |
| Example 13 | Balance | 100.0 | 25 | 19 | 0.0 | 12.0 | 32.0 | 0.030 | 0.010 |
| Comparative Example 4 | Balance | 100.0 | 35 | 32 | 0.0 | 1.5 | 19.0 | 0.030 | 0.010 |

Properties of ceramic core

| | Sintering temperature ° C. | Relative density % | Bending strength [MPa] Room temperature 25° C. | Bending strength [MPa] High temperature 1550° C. | Contraction rate during a casting process % | Presence or absence of undissolved residue |
|---|---|---|---|---|---|---|
| Example 8 | 1300 | 75 | 17 | 45 | 0.5 | Absent |
| Example 9 | 1300 | 75 | 25 | 45 | 0.4 | Absent |
| Example 10 | 1250 | 71 | 15 | 33 | 0.3 | Absent |
| Example 11 | 1350 | 70 | 18 | 31 | 0.4 | Absent |
| Example 12 | 1300 | 75 | 15 | 18 | 0.8 | Absent |
| Example 13 | 1300 | 71 | 13 | 15 | 0.3 | Absent |
| Comparative Example 4 | 1300 | 60 | 10 | 3 | 0.8 | Absent |

Note:
In the table, the description "Balance" includes inevitable impurities, and "Coarse grain" shows a rate of the intentionally added powder having a granularity of 50 to 100 μm.

The ceramic cores according to the invention shown in Table 2 (Examples 8 to 13) are constituted by 0.1 to 15.0 mass % of alumina, 0.005 to 0.1 mass % of at least one of potassium and sodium and the balance being amorphous silica and inevitable impurities, wherein the amorphous silica includes 5 to 30 mass % of coarse grains having a granularity of 50 μm or more, and the amorphous silica has an average particle size adjusted to 5 to 35 μm. The core all had a bending strength of not less than 10 MPa at a room temperature (25° C.) and a bending strength of not less than 5 MPa at a high temperature (1550° C.).

It was confirmed that the ceramic core according to the invention constituted by the mixture shown in Table 2 had a sufficient bending strength for handling at a room temperature after sintered, and a high bending strength endurable to casting for a long time. Moreover, the core was not damaged in the evaluation processes during handling, an injection process and a casting process. Besides, all of the cores had a favourable dissolvability to an alkaline aqueous solution after casting. Moreover, all of the cores had a contraction rate during a casting process of 1.0% or less, and were able to have dimensional stability at the high temperature.

On the other hand, Comparative Example 4 containing as large as 35 mass % of a powder (coarse grain) having a granularity of 50 to 100 μm even though all the silica was amorphous silica had a low bending strength at a high temperature (1550° C.) of 3 MPa and was not able to obtain the bending strength endurable to casting for a long time.

The invention claimed is:

1. A sintered ceramic core comprising 0.1 to 15.0 mass % of alumina, 0.005 to 0.1 mass % of at least one of potassium and sodium, optionally 0.5 to 35.0 mass % of zircon, and the balance being silica and inevitable impurities, wherein the silica comprises not less than 90 mass % amorphous silica.

2. The ceramic core according to claim 1, wherein the silica consists of amorphous silica.

3. The ceramic core according to claim 1, comprising 0.1 to 15.0 mass % of alumina, 0.005 to 0.1 mass % of at least one of potassium and sodium, 0.5 to 35.0 mass % of zircon, and the balance being the silica and inevitable impurities.

4. The ceramic core according to claim 1, having a relative density of 60 to 80%.

5. The ceramic core according to claim 1, having a bending strength of not lower than 10 MPa at a room temperature (25° C.) and a bending strength of not lower than 5 MPa at 1550° C.

6. The ceramic core according to claim 1, wherein the ceramic core is produced by sintering a mixture comprising 0.1 to 15.0 mass % of alumina, 0.005 to 0.1 mass % of at least one of potassium and sodium, 0.5 to 35.0 mass % of zircon, and the balance being amorphous silica and inevitable impurities, the amorphous silica including 5 to 30 mass % of coarse grains having a particle size of at least 50 μm, the amorphous silica having an average particle size of 5 to 35 μm, wherein the ceramic core has a relative density of 60 to 80%, a bending strength of not lower than 10 MPa at 25° C. and a bending strength of not lower than 5 MPa at 1550° C.

* * * * *